United States Patent
Haroush

(10) Patent No.: US 11,500,414 B2
(45) Date of Patent: Nov. 15, 2022

(54) SECURE PRODUCT DISPLAY FOR RETAIL ENVIRONMENT

(71) Applicant: Outform Ltd., Moshav Magshimim (IL)

(72) Inventor: Ariel Haroush, North Miami, FL (US)

(73) Assignee: Outform Ltd., Miami, FL (US)

( * ) Notice: Subject to any disclaimer, the term of this patent is extended or adjusted under 35 U.S.C. 154(b) by 295 days.

(21) Appl. No.: 16/802,659

(22) Filed: Feb. 27, 2020

(65) Prior Publication Data
US 2020/0272199 A1 Aug. 27, 2020

Related U.S. Application Data

(60) Provisional application No. 62/811,002, filed on Feb. 27, 2019.

(30) Foreign Application Priority Data

May 30, 2019 (CN) .................. 201920801995.X

(51) Int. Cl.
| | |
|---|---|
| G03B 21/14 | (2006.01) |
| H04N 9/31 | (2006.01) |
| G06F 1/16 | (2006.01) |
| F16M 11/22 | (2006.01) |

(52) U.S. Cl.
CPC .......... *G06F 1/1607* (2013.01); *F16M 11/22* (2013.01); *G03B 21/147* (2013.01); *G06F 1/1626* (2013.01); *H04N 9/3161* (2013.01); *H04N 9/3164* (2013.01)

(58) Field of Classification Search
CPC .... H04N 9/3173; G03B 21/145; G03B 21/30; G06F 1/1626; G06F 1/1607
See application file for complete search history.

(56) References Cited

U.S. PATENT DOCUMENTS

| | | | |
|---|---|---|---|
| 6,179,426 B1 * | 1/2001 | Rodriguez, Jr | H04N 5/74 353/69 |
| 2003/0123032 A1 * | 7/2003 | Rodriguez, Jr. | G03B 21/30 353/74 |
| 2005/0078092 A1 | 4/2005 | Clapper | |
| 2010/0315327 A1 | 12/2010 | Virolainen | |
| 2011/0266232 A1 | 11/2011 | Kahler et al. | |

(Continued)

FOREIGN PATENT DOCUMENTS

| | | |
|---|---|---|
| CN | 108399555 | 8/2018 |
| EP | 1374108 | 1/2004 |

(Continued)

OTHER PUBLICATIONS

Hawkesmoor "Mili HI-P60 Power Pico Projector, Turn Your iPhone into a Cinema", The Register, p. 1-6, May 7, 2010.

(Continued)

*Primary Examiner* — Ryan D Howard
(74) *Attorney, Agent, or Firm* — Locke Lord LLP; Scott D. Wofsy; Michael J. Pollack

(57) ABSTRACT

A secure display stand for an electronic device or other object plays electronic media relating to the device on display. A holder holds the electronic device to be displayed, and an arm extends from the surface to the holder. A projector is associated with the arm and directed towards the surface to project media images onto the surface.

17 Claims, 7 Drawing Sheets

(56) References Cited

U.S. PATENT DOCUMENTS

| | | | |
|---|---|---|---|
| 2014/0059828 A1 | 3/2014 | Reynolds et al. | |
| 2014/0106608 A1* | 4/2014 | Howarth | F16M 13/00 248/176.1 |
| 2016/0239154 A1* | 8/2016 | Suggs | G06F 3/03545 |
| 2016/0381332 A1 | 12/2016 | Stout | |
| 2017/0343805 A1 | 11/2017 | Amaru et al. | |
| 2019/0049827 A1 | 2/2019 | Wang et al. | |

FOREIGN PATENT DOCUMENTS

| | | |
|---|---|---|
| WO | WO 2015/116220 | 8/2015 |
| WO | WO 2017/068466 | 4/2017 |
| WO | WO 2017/079482 | 5/2017 |

OTHER PUBLICATIONS

European Search Report and the European Search Opinion dated Jun. 26, 2020 From the European Patent Office Re. Application No. 20159914.9. (8 Pages).

\* cited by examiner

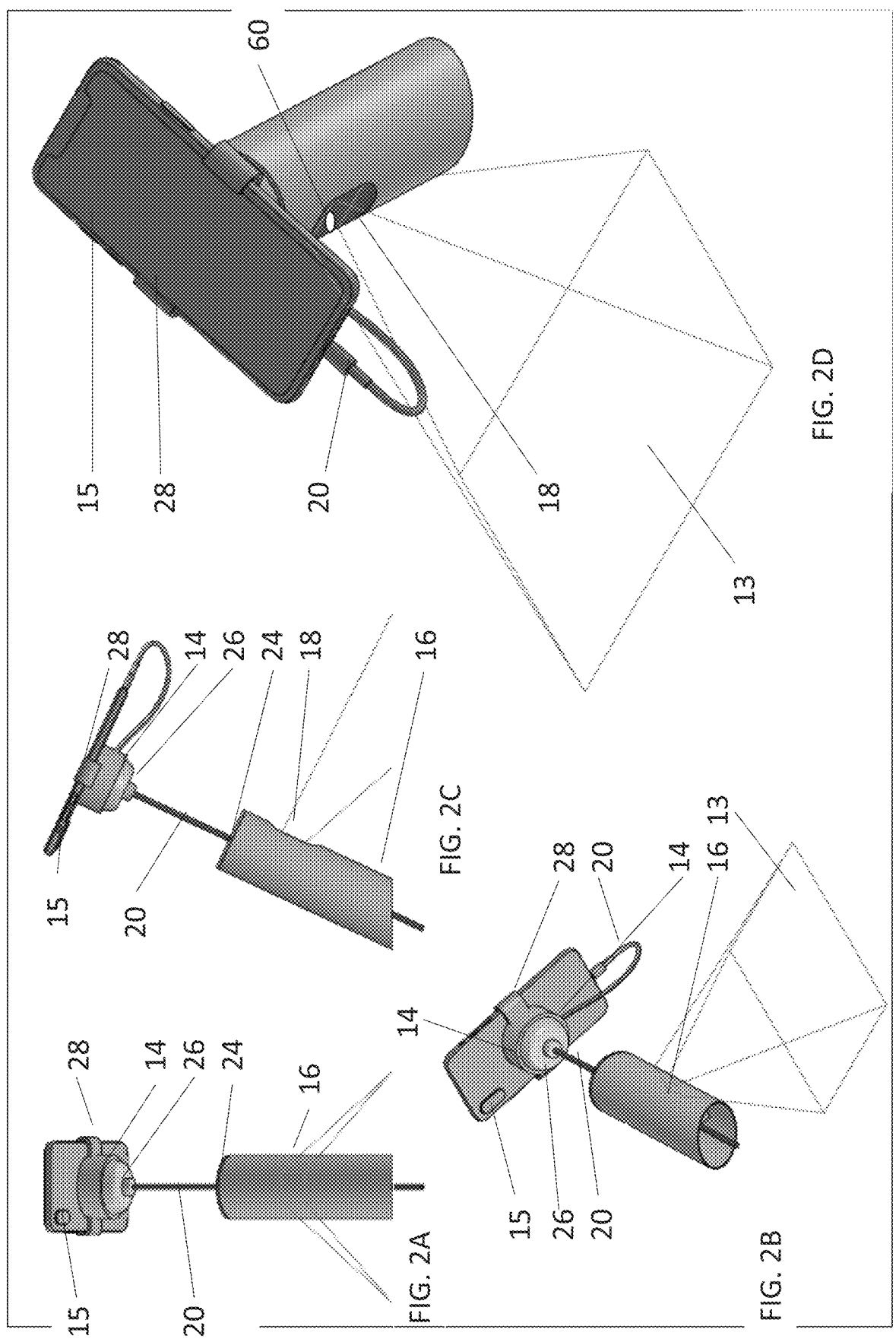

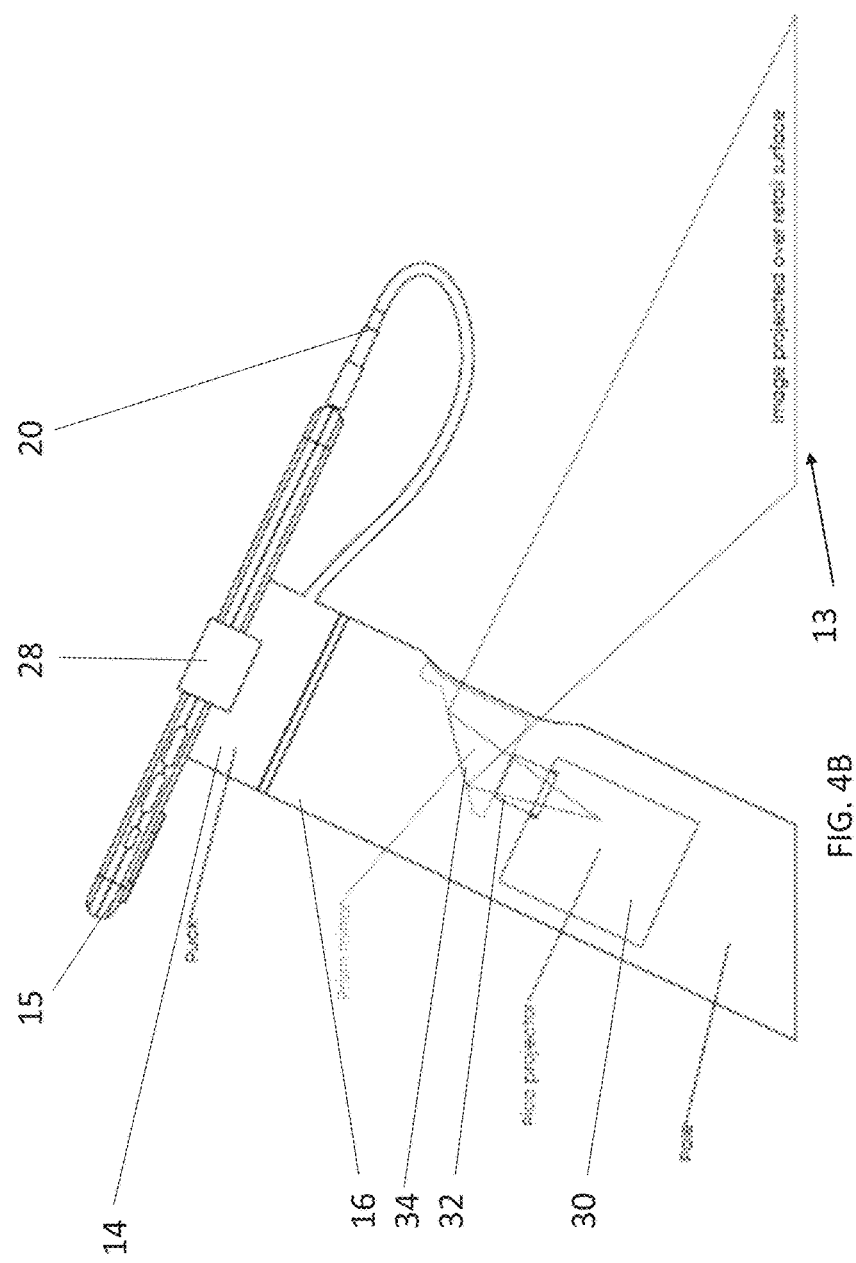
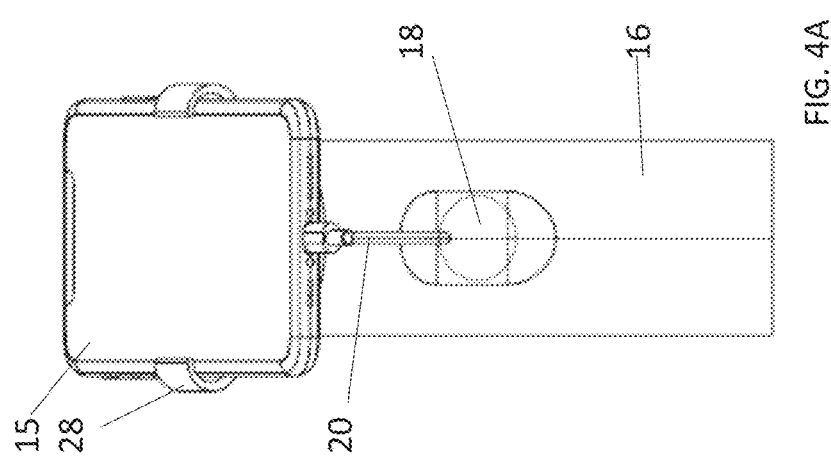
FIG. 4A
FIG. 4B

SECURE PRODUCT DISPLAY FOR RETAIL ENVIRONMENT

RELATED APPLICATIONS

This application claims the benefit of priority of Chinese Patent Application No. 201920801995.X filed on May 30, 2019.

This application also claims the benefit of priority under 35 USC § 119(e) of U.S. Provisional Patent Application No. 62/811,002 filed on Feb. 27, 2019.

The contents of the above applications are all incorporated by reference as if fully set forth herein in their entirety.

FIELD AND BACKGROUND OF THE INVENTION

The present invention, in some embodiments thereof, relates to a product display stand and, more particularly, but not exclusively, to such a product display stand for a retail environment, such as a shop selling electronic devices, and further to a secure product display stand.

Small handheld electronic devices such as mobile telephones, cameras and also wearable devices, such as smart watches, VR headsets, sports monitors and the like, are increasingly available on the high street and shops selling the devices and wearables are facing unique issues in presenting these products to the consuming public. The devices require a steady electricity supply, as the screen display requires power and needs to be shown as part of the display to the customer. In some cases, data connections may also be required to provide data to the device. The devices are small and relatively expensive, making them attractive for thieves, and yet the personal nature of the devices means that allowing the customer to try them is required.

In many stores, the information that is coupled with the displayed product is merely a printed ticket with pricing and some minimal product information. Certain stores have separate LCD screens, which are positioned when the store is designed and cannot respond to changes in the layout of the store.

Thus to date, shops selling mobile phone, cameras, tablets and wearables have mounted the devices on display stands where they can be attached to chargers, and have generally required staff to be on hand to show the devices to customers.

Furthermore, these products are complex and the differences between competing products can often be quite subtle. Thus, complex information has to be presented to the customer.

Current solutions allow the devices to be charged, or allow the devices to be secure, or allow the devices to be easily handled by the consumer. The better solutions allow two out of the above three, and no solution has any better way of providing information to the public than merely providing printed information, or separated digital ticketing in association with the product. Regarding digital ticketing, the retail industry may use stores, kiosks, or other points of purchase, and an information label may be provided which pertains to features or price or additional promotions. Such a label may be referred to as ticketing, edge label, label, fact tag, value messaging and similar terms. The label may be printed and placed in physical association with the goods or may be provided in virtual form say by scanning a barcode placed in association with the product. Alternatively, the information may be displayed on the screens referred to above.

SUMMARY OF THE INVENTION

The present embodiments may relate to any of the solutions for a secure display that allows a user to try out the device or wearable, and provides the user with information about the product being tried, so that the user takes the device to try out and is immediately presented with up-to-date information or even with an interactive display.

According to an aspect of some embodiments of the present invention there is provided a secure display stand for an electronic device or wearable or other object, comprising:
   a holder for holding the electronic device;
   an arm extending from a surface to the holder; and
   a projector associated with the arm and directed towards the surface to project images onto the surface.

An embodiment may comprise:
   a socket;
   a lock for locking around a body or bracelet or strap of the electronic device or wearable or other object to be displayed; and
   a bracket extending from the bracelet lock, the bracket having a charging element for charging of the wearable, wherein the lock is attached by a retractable cord to the socket.

In an embodiment, the projector is configured to correct the images for distortion due to an angle of projection onto the surface.

An embodiment may comprise a lens arrangement for carrying out the correcting to a projected beam carrying the images.

In an embodiment, the lens arrangement is further configured to provide a short/ultra-short throw ratio, thereby to provide a projection area, which is large, compared to the projection distance.

An embodiment may comprise a prism for directing light from the projector to a hole in the arm to project light through the hole onto the surface, thereby allowing the projector to be aligned along a length of the arm.

An embodiment may comprise a prism or mirror for directing light from the projector to a hole in the arm to project light through the hole onto the surface, wherein the lens arrangement is located between an objective lens of the projector and the prism.

An embodiment may comprise a correction unit configured to provide keystone correction to the images prior to projection, the correction being as to compensate for the distortion.

An embodiment may comprise a recoiler box located under the surface to retract and extend the cord, or wherein the cord comprises a curly cord.

In an embodiment, the projector comprises an opening built into a wall of the arm, the opening being for projection therethrough.

In an embodiment, the projector comprises a microprojector or a pico-projector or a laser projector or a nano-projector.

In an embodiment, the projector comprises a light source located in the arm.

In an embodiment, the projector comprises a light source located outside of the arm and connected to project through the lens using an optical fiber.

In an embodiment, the light source comprises one or more light emitting diodes or a semiconductor laser.

Embodiments may comprise a camera directed at an image projected onto the surface or any other detection arrangement that allows the projected image to be used as a touch screen.

In an embodiment, the camera is connected to an image processing module to translate user interactions with the image into commands, thereby to provide interactivity with the projection.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 2A to 2D are four different perspective views of the display stand of FIG. 1;

FIGS. 4A and 4B are two perspective views showing the projector inside the arm according to embodiments of the present invention;

DESCRIPTION OF SPECIFIC EMBODIMENTS OF THE INVENTION

Figure 1:
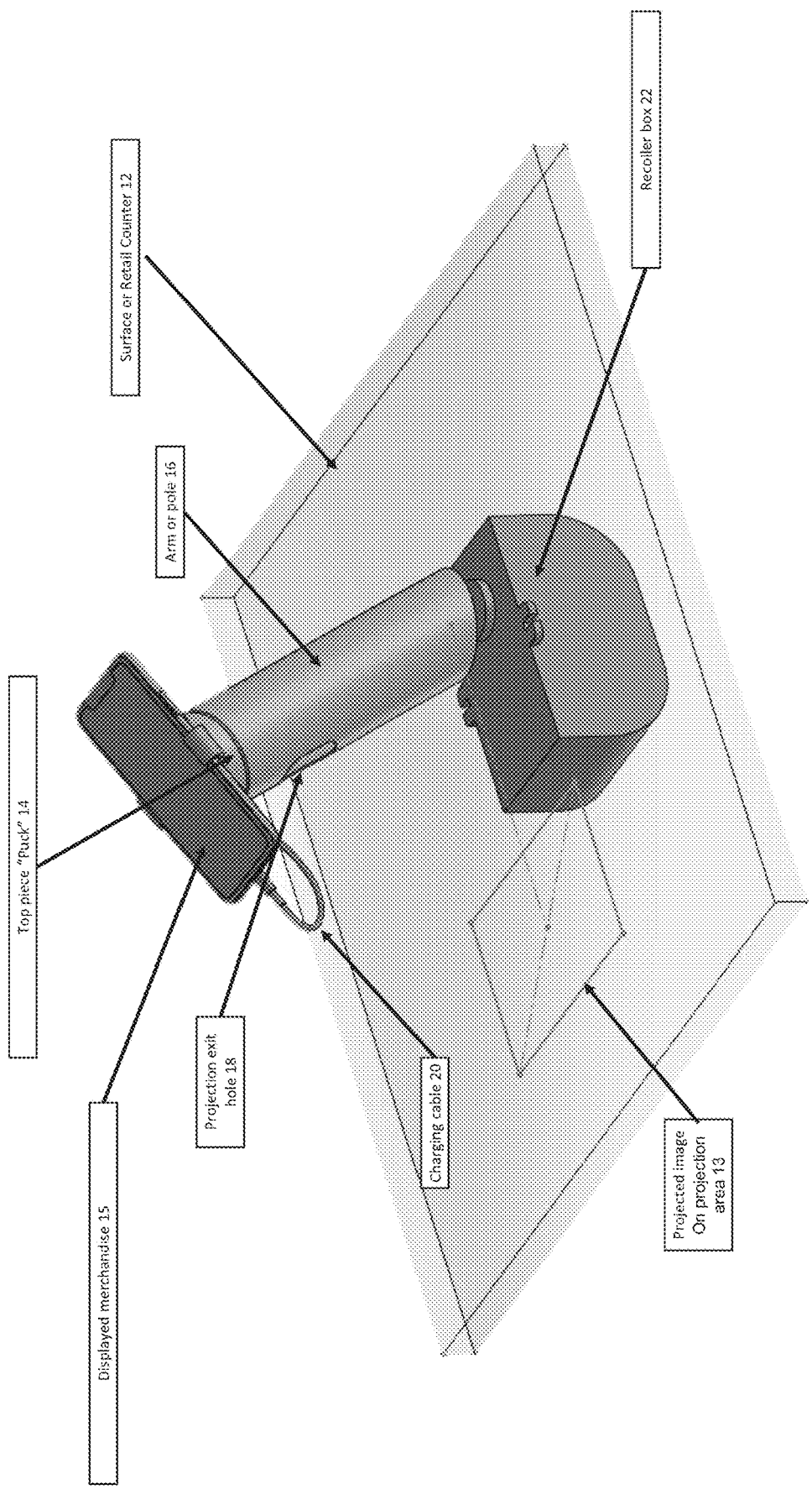
FIG. 1 is a simplified perspective view of a display stand according to embodiments of the present invention.

The present invention, in some embodiments thereof, relates to a product display stand and, more particularly, but not exclusively, to such a product display stand for a retail environment, such as a shop selling electronic devices.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a simplified perspective view of a display stand 10 to which the present embodiments are applied. The display stand is particularly suitable for displaying small electronic devices that users may wish to handle before purchasing, for example mobile telephones and wearable devices such as smart watches. More generally, the stands are suitable for any product of the appropriate size.

Such a stand may include a surface 12, which may be smooth and light colored or at least have an area 13 that is smooth and light colored for projection of an image.

A holder 14, referred to as a puck, holds a device being displayed, such as mobile telephone 15.

An arm 16, or pole, extends from the surface 12 to the holder 14. The arm may be angled as shown. A projector may be associated with the arm 16 and project still or moving images towards the surface 12, or to the projection area 13 on the surface. The projector may be a microprojector or pico projector or nano-projector. The various kinds of projector are all specific types of an Image Projector, which may also be considered a light engine and which may generally include lenses, a light source and surrounding electronics to make a fully functioning projector. The projector may be located inside the arm 14 or may be located elsewhere and use a light pipe to supply the light beam carrying the image for projection. The projected image exits the arm via opening 18 on its way to the surface 12.

For the case where the object being displayed is an electronic device in need of a power supply, the arm or pole 16 may house a retractable charging cable 20. The charging cable extends from recoiler box 22 located below surface 12 towards the product 15. The recoiler box typically has a spring-loaded drum on which the cable 20 is wound. A user can then inspect the product 15 by pulling it up from the holder and the cable remains connected. The user returns the product when finished and the cable is retracted.

Reference is now made to FIGS. 2A to 2D, which illustrate an embodiment in which the electronic product is securely attached so that users may try out the product but are prevented from surreptitiously removing the product from the display stand. Parts that are the same as in FIG. 1 are given the same reference numerals and are not described again except as needed for an explanation of the present embodiments.

Figure 3B:
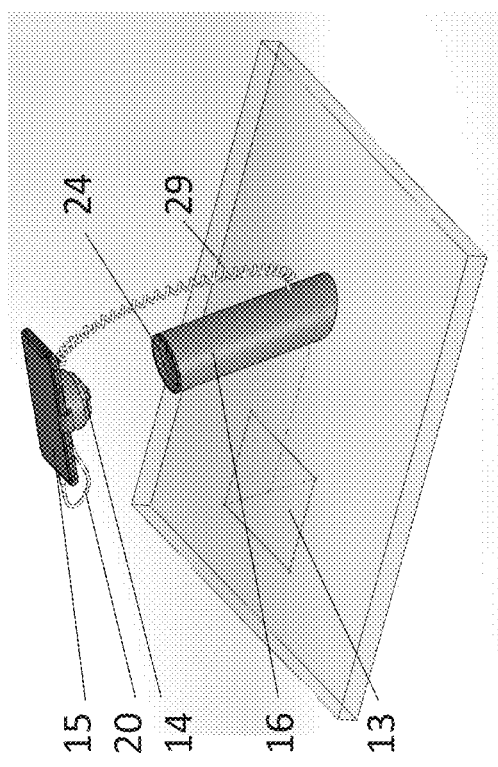
FIGS. 3A to 3D are four different perspective views of an alternative embodiment of the display stand of FIG. 1.
Figure 3D:
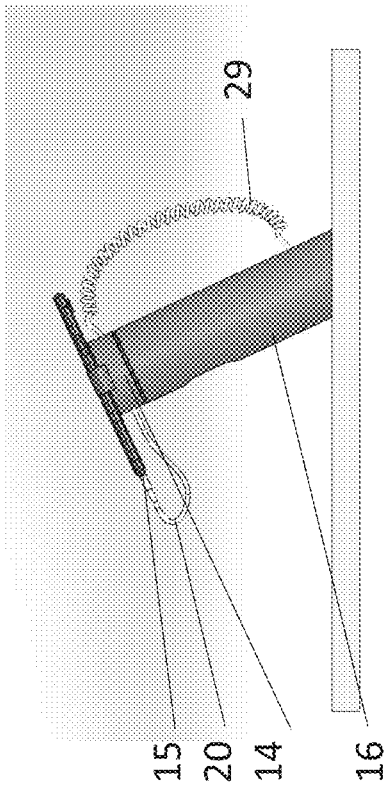
Figure 3A:
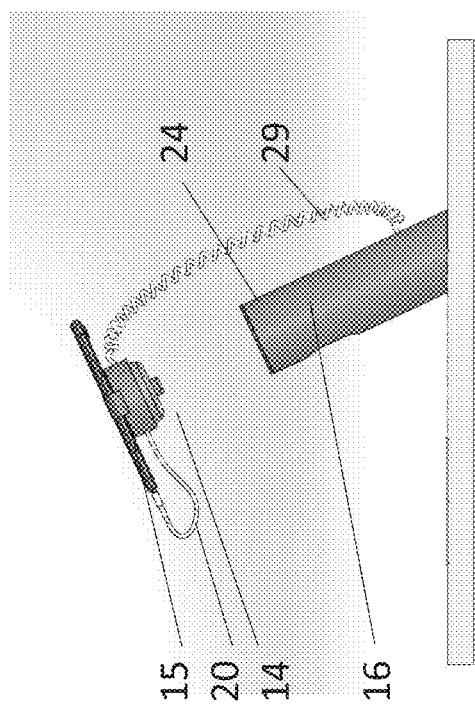
Figure 3C:
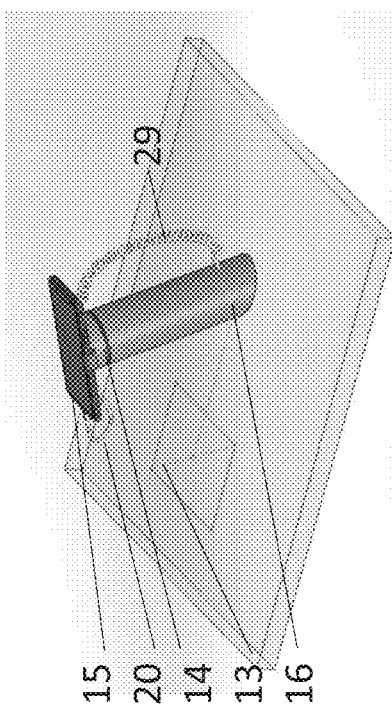

The retractable cable 20 passes out of the arm 16 through a socket 24 in the holder 14. Socket 24 is a concave inclusion in the top of the arm 16, which accepts convex extrusion 26 that is part of holder 14, see FIG. 3B. Holder 14 locks brackets 28 around the product 15. The retractable cord provides a charging element for charging of the product, and the lock arrangement is always pulled back by the retractable cord onto the socket 24 so that the convex shape 26 may fall into the socket 24 when the product is relinquished by the potential purchaser.

As shown most clearly in FIGS. 2B and 2C, the cord 20 passes from the arm 16 and socket 24, inside the holder 14 and from there to the device charger. The cord cannot be removed without breaking the holder 14 or the cord and if such an event were to occur an alarm would be set off.

In embodiments, the removal of the product 15 from the holder 14 may trigger the projection of images from the projector. In other embodiments, a proximity detector, detecting a person near the product may trigger the projection of images and/or may trigger a change in the content, say from a video to a static image of price and model names and vice versa. In a further embodiment, both proximity and removal of the product may trigger images and in a yet further embodiment, proximity and removal of the product may trigger different images. In general, the displayed content may change from still to moving images and vice versa and show prices and configurations and different ways of using the device and any other relevant information that may help the purchaser to consider the product.

Reference is now made to FIGS. 3A to 3D, which are different perspective views of an alternative embodiment of the display stand of FIG. 1. Parts that are the same as in previous figures are given the same reference numerals and are not discussed again except as needed for an understanding of the present figures. In FIGS. 3A to 3D a variation is shown in which the recoiler box is dispensed with and a curly wire section 29 is used instead to provide the product with extension properties.

Reference is now made to FIGS. 4A and 4B, which are simplified cutaway, diagrams of the inside of the arm 16, showing a pico projector inside. Parts that have been referred to above are given the same reference numerals and are not referred to again except as necessary for an understanding of the present figures. The arm or pole 16 is hollow and holds pico projector 30 in its internal space. The pico projector has a light source, which is modulated with a still or moving image to project the still or moving image. Typically the light beam is internally reflected and refracted from a digital micromirror device (DMD) and there are other ways to provide a small projector, however a DMD is currently the preferred device in allowing small volume and still providing a sufficient brightness. The beam passes through objective lens 32 and prism 34 and then out through opening 18 and on to projection area 13 of surface 12 (FIG. 1). The pico projector is oriented along the lengthwise axis of the arm, and the prism allows for the beam to be redirected from the pico projector axis onto an axis that reaches the surface 13, this latter axis not necessarily being perpendicular to the arm axis.

A pico projector is a compact projection device designed to take the place of conventional, bulky projectors for presentations and media viewing. There are a number of kinds available including standalone models that connect to another device through a USB, HDMI or other cable to display content, USB pico-projectors which may connect to computing devices such as a mobile phone or a tablet, for both content and power. Embedded models exist as a hardware module in a mobile telephone or a digital camera or a tablet and indeed a smartphone with an embedded pico projector is known as a projector phone. Media player pico projectors whether embedded or connected may include internal memory and/or ports for microSD cards or USB devices so they can access content without connecting to an external system. For interactive presentations, a pico projector can enable control of a computer, and may be used in conjunction with any of a laser pointer, a webcam and an image processing application. In the present embodiments, a webcam or other imaging device may be used to make the display interactive, as will be discussed below, and a laser pointer is most likely not used in an automatic display. In this case, an automatic display includes inter alia a display with a finger touch and/or pointing capabilities.

It is noted that the term "microprojector" is also used.

Figure 5:
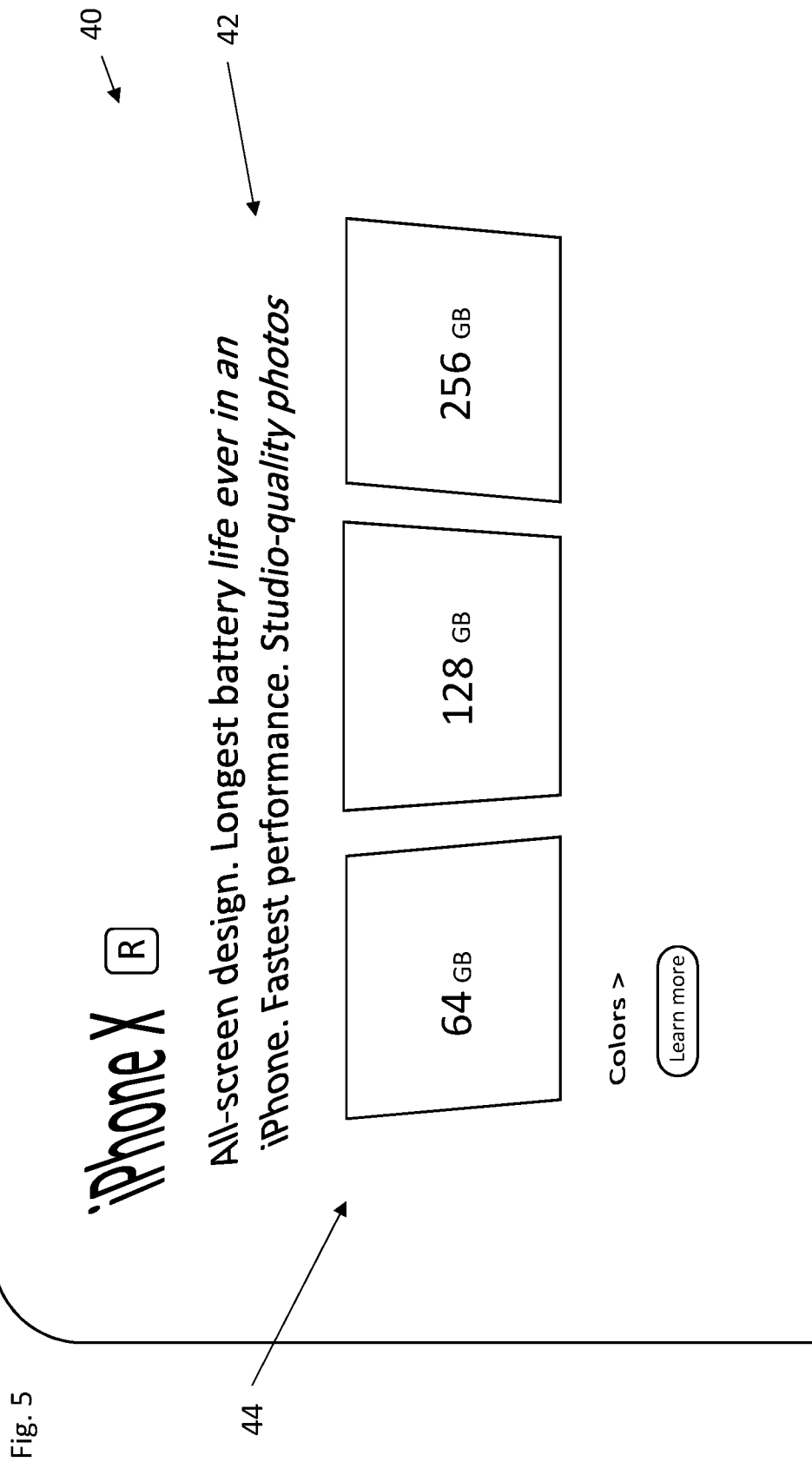
FIG. 5 is a simplified diagram showing how an image projected according to the present embodiments would be distorted if not corrected either optically or digitally.

Reference is now made to FIG. 5, which illustrates an image 40 projected at an angle onto a surface. As can be seen there is distortion in the image due to the Keystone effect, with the part 42 of the image further away from the projector being enlarged compared with the part 44 of the image closer to the projector. In an embodiment, the projector corrects the images for the distortion due to the angle of projection and may use what is known as Keystone correction. That is to say, since the angle is known, part 44 may be shrunk in compensation compared to part 42 in the image prior to projection or during projection, so that Keystone correction of the Keystone effect leads to a correctly proportioned image on the surface.

There are two ways in which this compensation may be done. One way is to carry out the compensation digitally using Software keystone correction, prior to projection by adding a digital correction unit, in which the image may be digitally corrected on the data level—meaning the original streaming content will have a counter-distortion software filter to counteract the Keystone effect called software Keystone correction.

Figure 6:
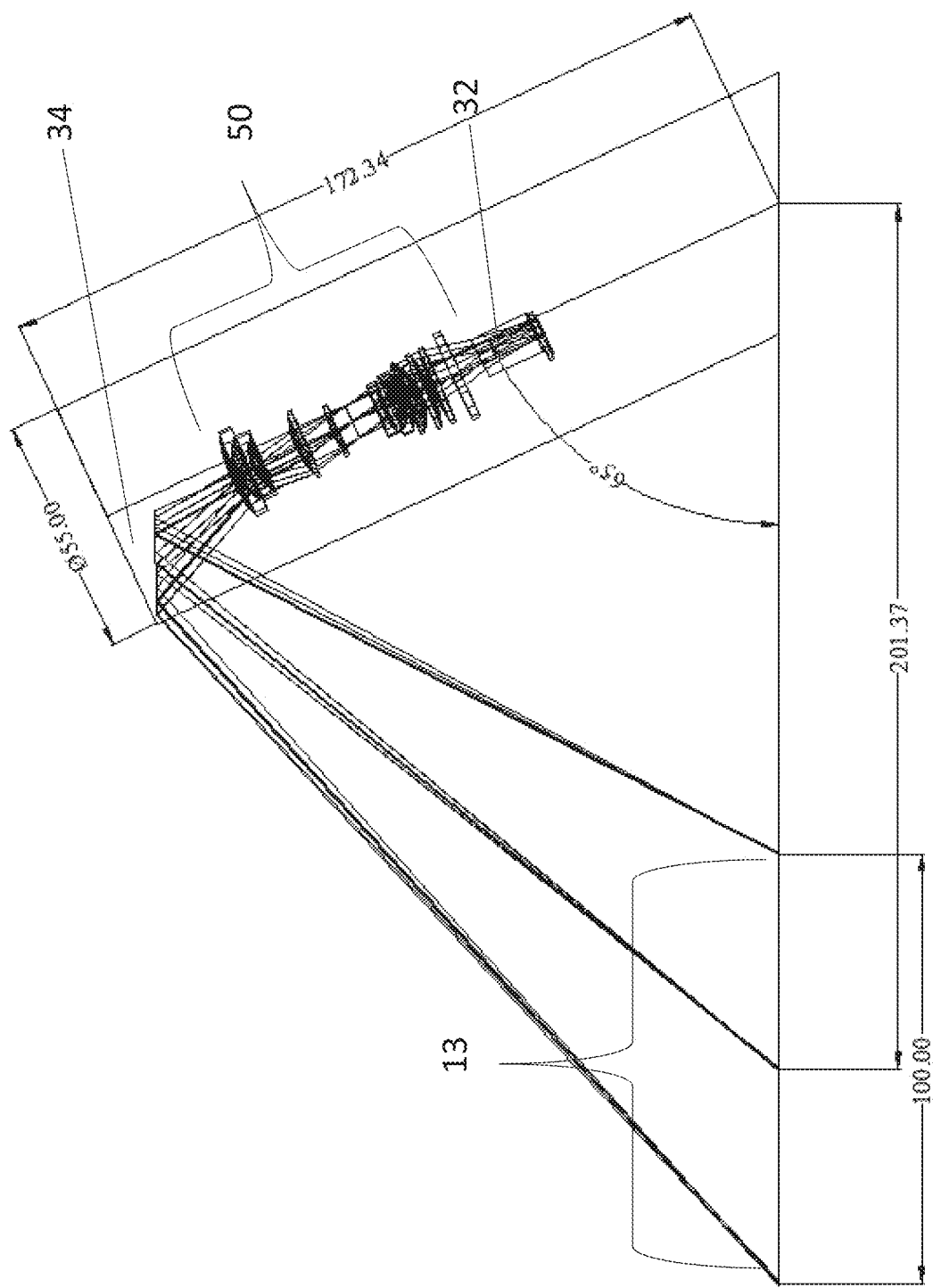
FIG. 6 is a simplified diagram showing a lens array for optical correction of a projected image according to the present embodiments.

Another way is during projection by distorting the projection beam optically, using optical Keystone correction, based on a lens arrangement as shown in FIG. 6. FIG. 6 is a cutaway view showing the lenses in situ inside the arm. Rays are traced though the lenses. Lens 32 is the objective lens of the pico projector. Prism 34 angles the beam towards surface 13. As shown, the angle between the projector and the surface is 65° but other embodiments may be at different angles, say 60° or 70° or 69° for example. A sequence of lenses 50 is placed between the objective and the prism, and the combination of the objective, the prism and the intervening lens arrangement may correct the projected beam. In general, optical compensation is regarded as providing a more precise image although digital compensation avoids the need for additional hardware.

In one embodiment, as the distortion is heavy and inherent in the design, digital and optical compensation may be used in combination, to complement each other.

Lenses 50 have another function, which is to create a large image per short distance ratio, referred to as a "Short throw" and "Ultra short throw". In general, optical Keystone correction can be managed without a complex lens array—but a short or Ultra short throw ratio can only be achieved only via a specific lens array.

In embodiments, the light source for the projector may be external to the arm 16 and light may be piped in using an optical fiber.

The light source for the projector may be light emitting diodes (LED) or semiconductor lasers.

Returning now to FIG. 2D and in addition to the projector light output, the opening 18 may further include a camera 60 which is aimed at the projection area 13 and at the image projected on to the projection area. The camera 60 may be connected to an image processing module and may translate user interactions with the image into commands. Thus, finger gestures may be recognized and used as input. A keyboard may be projected onto the space and the camera may identify key touches.

Figure 7A:
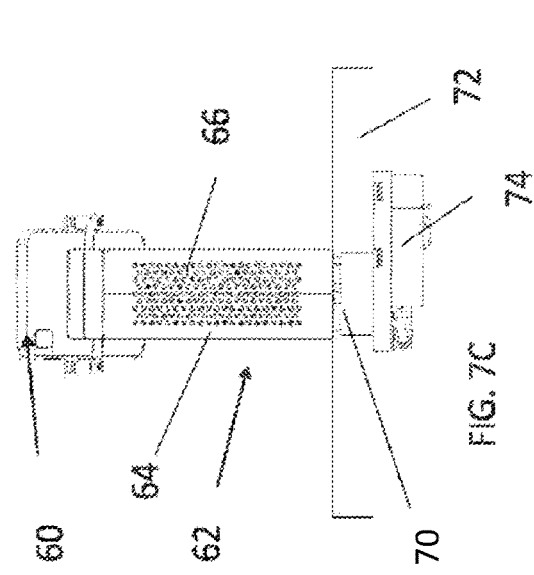
FIGS. 7A to 7F are six simplified diagrams illustrating a further device according to an embodiment of the present invention.
Figure 7C:
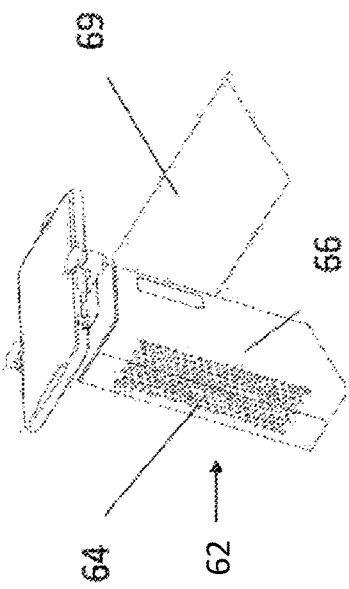
Figure 7B:
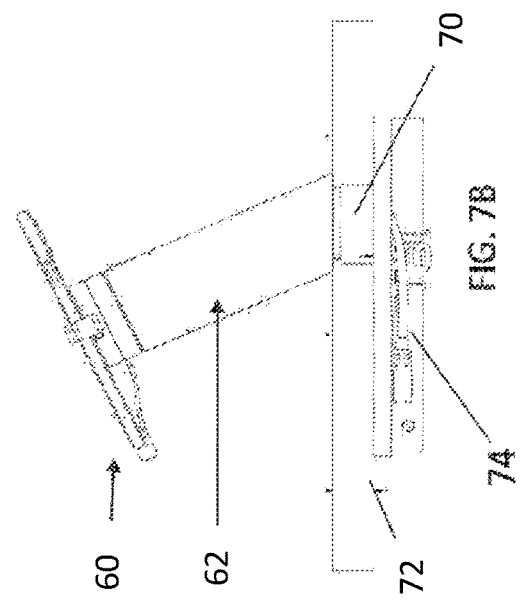
Figure 7E:
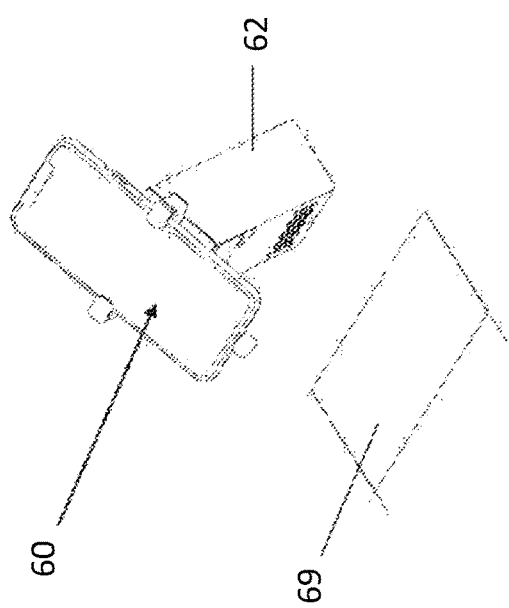
Figure 7D:
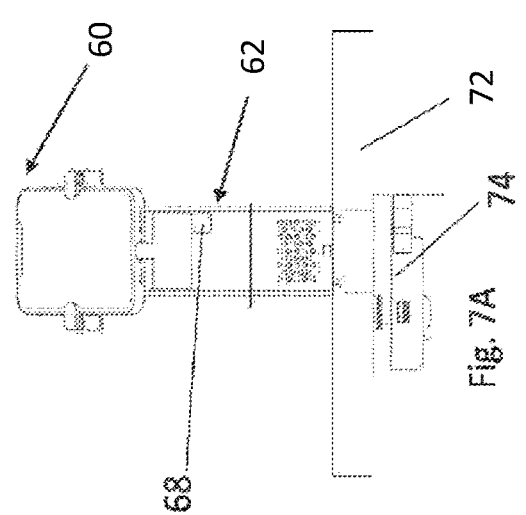
Figure 7F:
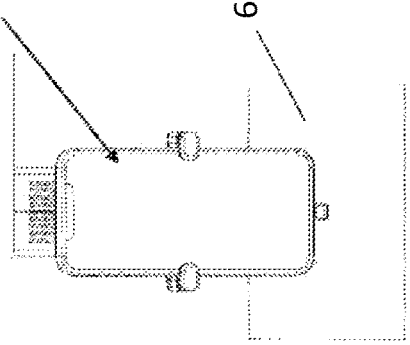

Reference is now made to FIGS. 7A to 7F, which illustrate a further device built in accordance with the embodiments of the present invention. FIG. 7A is a front view. FIG. 7B is a side view. FIG. 7C is a rear view. FIG. 7D is a view from above. FIGS. 7E and 7F are two different perspective views from above. The phone or other merchandise to be displayed is denoted 60. The arm or pole 62 is constructed in two halves 64 and 66, which are fitted together. Lens 68 is located on the front of the pole through which the image is projected onto a region 69, typically rectangular, in front of the arm. The pole fits through a socket 70 in counter 72, and the socket allows for fitting of components 74 underneath the counter. Such components may include a media player for playing the media to be projected, an alarm for indicating that the merchandise has been detached from the display, and a pullbox for allowing the merchandise to be raised from the arm by the customer. The media player may be connected via an optical fiber through the counter to project the media.

It is expected that during the life of a patent maturing from this application many relevant projector types, including microprojectors and pico-projectors will be developed and the scopes of the corresponding terms are intended to include all such new technologies a priori.

The terms "comprises", "comprising", "includes", "including", "having" and their conjugates mean "including but not limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the text is to be construed as if such a single embodiment is explicitly written out in detail. Conversely, various features of the invention, which are, for brevity, described in the context of a single embodiment, may also be provided separately or in any suitable subcombination or as suitable in any other described embodiment of the invention, and the text is to be construed as if such separate embodiments or subcombinations are explicitly set forth herein in detail.

Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A secure display stand for an electronic device or wearable or other object, the secure stand playing electronic media, the secure display stand comprising:
   a holder for holding said electronic device;
   an arm extending from a surface to said holder;
   a projector associated with said arm and directed towards said surface to project media images of said electronic media onto said surface; and
   a prism for directing light from said projector to a hole in said arm to project light through said hole onto said surface, thereby allowing said projector to be aligned along a length of said arm.

2. The secure display stand of claim 1, wherein said holder comprises:
   a socket;
   a lock for locking around a body or bracelet or strap of said electronic device; and
   a bracket extending from said lock, the bracket having a charging element for charging of said wearable, wherein the lock is attached by a retractable cord to the socket.

3. The secure display stand of claim 1, wherein said projector is configured to correct said images for distortion due to an angle of projection onto said surface.

4. The secure display stand of claim 3, comprising a lens arrangement for carrying out said correcting to a projected beam carrying said images.

5. The secure display stand of claim 4, wherein said lens arrangement is further configured to provide a short/ultra-short throw ratio, thereby to provide a projection area, which is large, compared to the projection distance.

6. The secure display stand of claim 4, wherein said lens arrangement is located between an objective lens of said projector and said prism.

7. The secure display stand of claim 3, comprising a correction unit configured to provide keystone correction to the images prior to projection, the correction being as to compensate for said distortion.

8. The secure display stand of claim 2, comprising a recoiler box located under said surface to retract and extend said cord, or wherein said cord comprises a curly cord.

9. The secure display stand of claim 1, wherein said projector comprises an opening built into a wall of said arm, the opening being for projection therethrough.

10. The secure display stand of claim 1, wherein said projector comprises a micro-projector or a pico projector or a laser projector or a nano-projector.

11. The secure display stand of claim 1, wherein said projector comprises a light source located in said arm.

12. The secure display stand of claim 4, wherein said projector comprises a light source located outside of said arm and connected to project through said lens arrangement using an optical fiber.

13. The secure display stand of claim 11, wherein said light source comprises one member of the group comprising one or more light emitting diodes or a semiconductor laser.

14. The secure display stand of claim 1, further comprising a camera, the camera being directed at an image projected onto said surface.

15. The secure display stand of claim 14, wherein said camera is connected to an image processing module to translate user interactions with said image into commands, thereby to provide interactivity with said projection.

16. A secure display stand for an electronic device or wearable or other object, the secure stand playing electronic media, the secure display stand comprising:
- a holder for holding said electronic device;
- an arm extending from a surface to said holder;
- a projector associated with said arm and directed towards said surface to project media images of said electronic media onto said surface, wherein said projector is configured to correct said images for distortion due to an angle of projection onto said surface;
- a lens arrangement for carrying out said correcting to a projected beam carrying said images; and
- a prism for directing light from said projector to a hole in said arm to project light through said hole onto said surface, wherein said lens arrangement is located between an objective lens of said projector and said prism.

17. The secure display stand of claim 16, comprising a correction unit configured to provide keystone correction to the images prior to projection, the correction being as to compensate for said distortion.

* * * * *